Dec. 22, 1953
A. J. WARNER ET AL
2,663,749
PRIMARY CELL
Filed Aug. 29, 1951
2 Sheets-Sheet 1
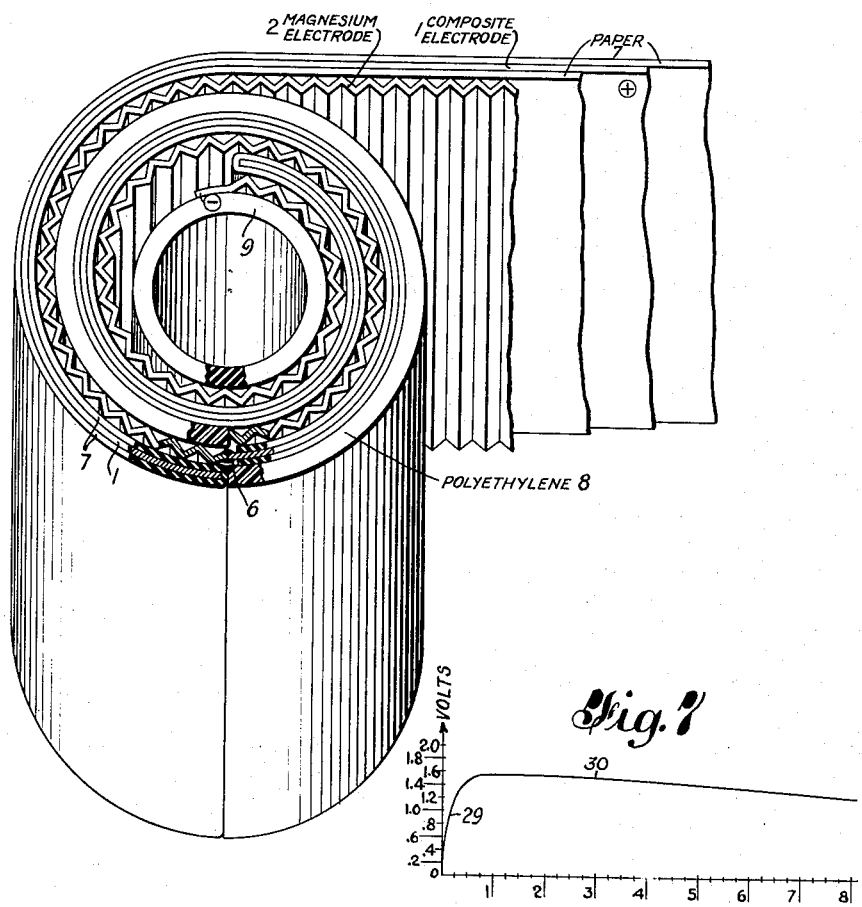
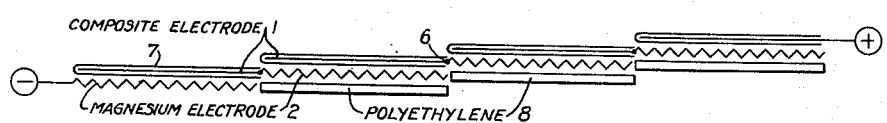
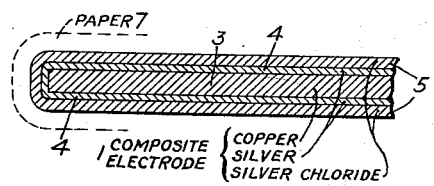
INVENTORS
ARTHUR J. WARNER
ANDRE R. GOBAT
BY
*Percy P. Lantry*
ATTORNEY Dec. 22, 1953 A. J. WARNER ET AL 2,663,749
PRIMARY CELL
Filed Aug. 29, 1951 2 Sheets-Sheet 2

INVENTORS
ARTHUR J. WARNER
ANDRE R. GOBAT
BY
ATTORNEY

Patented Dec. 22, 1953

2,663,749

UNITED STATES PATENT OFFICE 2,663,749

PRIMARY CELL

Arthur J. Warner, Glen Ridge, and André R. Gobat, North Caldwell, N. J., assignors to Federal Telecommunication Laboratories, Inc., Nutley, N. J., a corporation of Delaware Application August 29, 1951, Serial No. 244,136

14 Claims. (Cl. 136—100)

This invention relates to primary cells and more particularly to a deferred action type of electric cell which, when supplied with or immersed in an electrolyte, is ready for use.

Dry magnesium-silver halide primary cells have been proposed heretofore for storage in the dry state and later rendered operative by addition of a suitable electrolyte. These cells are useful in many applications but are expensive because of high silver content. Another disadvantage is the relatively high internal resistance of such cells.

One of the objects of this invention is to provide a primary cell of the magnesium-silver halide type which has a lower internal resistance than comparable magnesium-silver halide cells heretofore possessed.

Another object of the invention is to provide a deferred action primary cell having an unusually rapid voltage rise characteristic when supplied with electrolyte; and also one which provides a higher voltage than heretofore obtainable with magnesium-silver halide cells.

Still another object of the invention is to provide a primary cell construction which provides for rapid and complete wetting of the electrodes when supplied with or immersed in electrolyte; and which also permits easy and rapid escape of gases.

One of the features of the invention involves making the cathode of a base of relatively inexpensive conductive material, as compared with silver, with a coating thereon of a silver halide. By this construction a good conductive electrode is provided, thereby insuring a low internal resistance of the cell throughout its useful life. Also, by using relatively inexpensive conductive metals or alloys as a base, the base may be deeply etched or otherwise roughened prior to the application of silver, thereby enlarging the active surfaces of the electrode much more than is practical with a pure silver electrode.

An additional feature involves the method by which the silver halide is formed, whereby the electrode is rendered more reactive than silver halide electrodes heretofore processed. A silver coating is first applied by electro-deposition after which the silver is converted either partially or wholly into a silver halide, such as silver chloride. The crystals of the silver coating applied by electro-deposition are oriented substantially perpendicularly to the surface of the electrode. Where the silver is rolled, as is the case of a solid silver electrode or one clad with silver, the crystals are disposed for the most part substantially parallel to the surface of the electrode. This vertical orientation of crystals in accordance with the present invention not only enhances the chloriding process but also results in a silver chloride layer that is much more reactive than silver chloride electrodes heretofore processed.

Another feature comprises making the anode of the cell of magnesium foil which is corrugated to provide spaces for quick admission of electrolyte to all surfaces of the electrodes and also for rapid escape of gas. Still another feature is to provide the magnesium anode with an amalgam coating which resists action by moist atmosphere while the cell is in a dry state, and yet which greatly enhances cell action and insures a higher voltage output when the cell is supplied with electrolyte.

By using porous insulating and solid insulating spacers and rolling series connected strips of electrodes, a compact high voltage, high capacity, multi-cell battery is provided.

The above-mentioned and other features and objects of this invention and the manner of attaining them will become more apparent by reference to the following description taken in conjunction with the accompanying drawings, wherein:

Fig. 1 is a view in perspective of a cell assembly partially rolled in coil form with parts broken away showing details of a preferred embodiment in accordance with the principles of this invention;

Fig. 2 is a schematic illustration of a four-cell assembly prior to the rolling thereof into coil form;

Fig. 2A is a sectional view taken through the cathode;

Fig. 7 is a graph of a voltage curve for a single cell mode in accordance with the principles of this invention.

Figure 3:
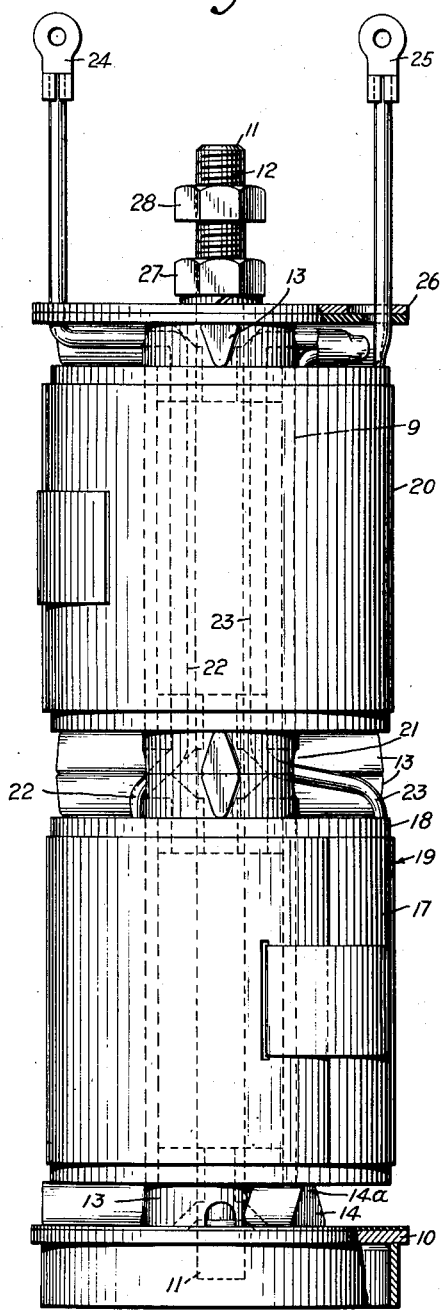
Fig. 3 is a view in side elevation of a battery assembly provided with two coils of cell assemblies.
Figure 4:
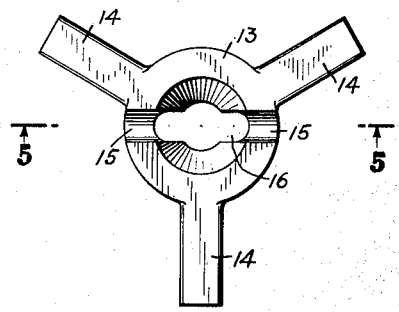
Fig. 4 is a top plan view of one of the star-shaped washers used in the battery assembly.
Figure 5:
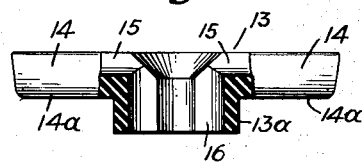
Fig. 5 is a cross-sectional view taken along line 5—5 of Fig. 4.
Figure 6:
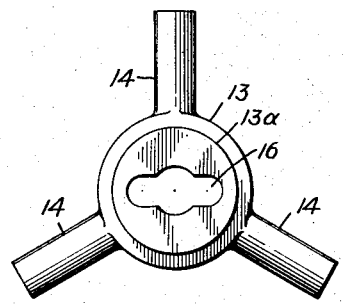
Fig. 6 is a bottom plan view of the star washer.

Referring to Figs. 1, 2, and 2A of the drawings, the details of the electrodes and a multiple cell assembly are shown. Fig. 1 shows two cells assembled and partially rolled into coil form, while Fig. 2 illustrates diagrammatically four cells prior to being rolled. Each cell comprises a composite cathode 1 and an anode of magnesium 2. The cathode 1 comprises a strip of base metal 3 which preferably is of copper, although other conductive materials may be employed, such as aluminum, iron, or alloys of each. The base strip is cleaned and etched to provide a rough surface, thereby increasing the capacity of the electrode. Silver 4 is applied electrolytically, the pre-requisite amount of silver necessary to provide for conversion to a silver halide layer 5 being thus supplied.

By electro-deposition the silver crystals are orientated substantially vertically with respect to the surface of the base. This vertical orientation of silver crystals not only enhances the haliding operation but also renders the silver halide highly reactive.

The halogen preferred is chlorine, and the chloriding is obtained electrolytically in a bath of sodium chloride, whereby silver chloride is formed. Other halides, such as bromide and iodide, may of course be used. In the chloriding of the silver, it is customary to control the chloriding operation so as to leave a thin layer 4 of silver beneath the chloride layer 5. This layer of silver prevents the base metal from being affected by the chloriding operation and from entering into the chemical reaction during use of the cell. In place of a thin coating of silver, a different metal barrier may be provided, such, for example, as gold or mercury. Where a special barrier layer is provided, prior to application of silver, all or substantially all of the silver subsequently supplied may be converted to a halide.

The magnesium electrode comprises a strip of magnesium or magnesium alloy in foil form. The magnesium foil is preferably corrugated so as to increase the useful surface thereof and also to relieve strains in the foil. The corrugations also permit rapid access to the surfaces of the electrodes of electrolyte when the cell is supplied with or immersed in electrolyte. The magnesium foil is preferably amalgamated by a treatment with a soluble mercuric salt followed by a fixing treatment. This treatment provides a magnesium amalgam coating over the magnesium electrode which resists the action of moisture in atmosphere coming in contact therewith prior to use of the cell. This coating, however, reacts quickly when supplied with a liquid electrolyte. It insures a rapid voltage rise and an ultimate voltage which is higher than normally obtainable by silver halide magnesium cells heretofore provided. By way of example the magnesium foil, after being cleaned and etched such as by immersion in a bath of acetic acid and sodium nitrate and suitably washed, may be treated by placing the foil in a bath of mercuric acetate and acetic acid. The proportions of this bath are not critical, the mercuric acetate, for example, may be in an amount between 5 to 100 grams per liter of solution, and the acetic acid may be in an amount of 2½ to 200 milliliters per liter of solution. The only pre-requisite is to provide sufficient mercuric ions in solution to effect a thin coating on the magnesium foil. Satisfactory ratio of these two ingredients used in practice is 30 grams mercuric acetate per liter of solution and 15 milliliters acetic acid per liter of solution. The immersion in this bath is for a short period of about 10 seconds at room temperature. The treated foil is next washed in water for about 30 seconds and then the coating is fixed by subjecting the foil to a bath of potassium dichromate for about 60 seconds at room temperature using in the neighborhood of 50 grams of potassium dichromate per liter of solution. The strength of this bath may be varied considerably depending upon the period of immersion and the temperature. This fixing operation is important since it insures a desired resistance for the electrode against action of moist atmosphere during the deferred action or storage period of the cell. After the fixing treatment the foil is washed with water, dipped in a bath of acetone, and dried, the acetone being used to enhance rapid drying. For further disclosure with regard to the amalgamating treatment, reference may be had to the co-pending applications of A. R. Gobat, Serial No. 243,357, filed August 23, 1951.

The cathode and anode foil strips are soldered together in pairs, except for the terminal strips, as indicated at 6 by use of tin and tin-lead material. The anode of each cell, except for the one in the last cell, is connected in series with the cathode of the next succeeding cell, thus leaving the cathode of the first cell and the anode of the last cell unconnected as terminals. The cathodes are covered with a thin spacing material. These spacers may be of any suitable porous insulating material, such as cotton base paper, hemp or woven cotton, rayon, nylon, Fiberglas, or other fibrous substances. Interposed between adjacent cells are strips 8 of solid non-hygroscopic flexible electrical insulating material such as polyethylene, polystyrene, polytetrafluoroethylene, or polymonochlorotrifluoroethylene. For a four-cell assembly, three such strips are employed. If desired, one long strip may be substituted for the three strips 8. The assembly is rolled upon a tubular core 9 of vulcanized fiber or other insulating material.

Each cell assembly, Fig. 3, is provided with a protective case 17 of sheet steel. Insulating the steel casing from the cell material is a varnished insulating cloth 18.

Referring to Figs. 3 to 6, a battery assembly containing two cell assemblies is shown. The assembly comprises a base 10 of steel or other suitable material with an upright post 11, the upper end of which is threaded as indicated at 12. A star-shaped washer 13 having three equally-spaced, radially-disposed arms 14 of insulating material such as polyethylene, polystyrene, polytetrafluoroethylene or polymonochlorotrifluoroethylene, is received on the post 11. The upper surface of the star washer 13 is provided with a diametrically disposed groove 15 and an elongated opening 16 for the purpose of threading leads therethrough. The bottom surface of the washer is provided with a tubular shank 13a adapted for reception in the tubular core 9 of a cell assembly. Each arm 14 is triangular in cross-section with the apex edge 14a on the side for contact with an adjacent cell. The coiled cell assemblies are received onto the post 11, as indicated by the two assemblies 19 and 20. The two cells are separated by two star washers 13 disposed in face-to-face relationship so that the grooves 15 of the washers coincide to provide an opening 21 through which leads 22 and 23 from the terminals of the cell assembly may be extended into the interior of the next adjacent cell unit. The leads are threaded from the lower unit 19 up through the interior sleeve 9 of the unit 20. These leads 22 and 23 are then connected to the leads from the unit 20 either in series or parallel, whichever may be desired, and then to terminals 24 and 25 for the complete assembly. An additional washer 13 is provided at the upper end of the assembly to provide the desired spacing between the unit 20 and an end plate 26. Nuts 27 and 28 are received on the threaded post 11 to retain the cell units and star washers in assembled position.

The battery shown in Fig. 3 may be provided with an outer casing with openings for admission of electrolyte or the battery assembly as shown may be disposed in a casing containing other electrical apparatus to be immersed in an electrolyte, such as, for example, fresh or salt water.

In Fig. 7 a voltage operating characteristic curve of a single cell is shown. The voltage build-up of the cell is illustrated by the substantially vertical portion 29 of the curve. When the cell is supplied with electrolyte, and the cell is discharged over a conductance of 0.14 mho for each dm.$^2$ electrode surface, the voltage rise reaches about 1.2 volts in about 15 seconds, and at the end of one minute the voltage exceeds 1.5 volts. As shown by the duration portion 30 of the curve, the voltage remains above 1.375 during continuous discharge for a period of over 6 minutes after which it tapers off gradually. From the voltage characteristic curve of the cell, it will be observed that the cell made according to the present invention has an exceptionally rapid voltage rise and a substantially flat operating voltage for a prolonged period. Where four or eight cells are connected in series, the resulting voltage is accordingly multiplied. This exceptionally high voltage output and rapid voltage rise characteristic is believed due largely because of the vertical crystal orientation of the silver chloride layer. The composite form of the cathode also ensures a low internal resistance with a minimum of silver.

While we have described above the principles of our invention in connection with a specific apparatus, it is to be clearly understood that this description is made by way of example only and not as a limitation to the scope of our invention, as set forth in the objects thereof and in the accompanying claims.

We claim:

1. A primary cell assembly comprising a series arrangement of cells each including a cathode and an anode separated by a sheet of porous electrical insulating material, the anode of each cell, except one end cell, being connected in series with the cathode of the next succeeding cell, whereby the anode of one end cell and the cathode of the other end cell are unconnected to comprise terminals for said series, and cell separating material disposed along one side of said series of cells, said series of cells and separating material being rolled into a coil with one terminal at the center of the coil and the other at the periphery thereof.

2. A primary cell assembly according to claim 1, wherein the cell-separating material is a non-hygroscopic, electrical insulating material.

3. A primary cell assembly according to claim 2, wherein the cell-separating material is selected from the group consisting of polyethylene, polystyrene, polytetrafluoroethylene, polymonochlorotrifluoroethylene.

4. A primary cell assembly according to claim 1, wherein the cell-separating material is provided in separate strips, one adjacent each cell except for the inner end cell.

5. A primary cell according to claim 4, wherein the coil of cells is further provided with a layer of insulating material surrounding the coil and a sheet metal wrapper thereabout.

6. A primary cell assembly comprising a plurality of coiled cell units, each coil being disposed on a sleeve of insulating material, a supporting post onto which said cell units are disposed, star-shaped spacer washers at the ends of said cells and means to secure said cell units on said post.

7. A primary cell assembly according to claim 5, wherein said star washers have radially extending arms, a tubular shank on one side and at least certain of the washers have a crosswise groove on the other side thereof to provide openings for extending lead connections from the terminals of said cells to the interior of said assembly.

8. A primary cell assembly according to claim 1, wherein the anode of each cell is corrugated in a manner such that when the anodes, cathodes and cell separating material are rolled into a coil, the corrugations of the anodes are parallel substantially to the axis of the coil.

9. A primary cell assembly according to claim 8, wherein the coil is disposed on a sleeve of insulating material, a supporting post is provided onto which said cell is disposed and ribbed members are carried by said post with at least one such member disposed at each end of said cell.

10. A primary cell assembly comprising a cathode electrode forming one terminal of said cell, an anode electrode forming the opposite terminal of said cell and at least one series connected cathode-anode electrode arrangement disposed intermediate said electrodes, a sheet of porous electrical insulating material disposed adjacent one of said electrodes, said electrodes and insulating material being rolled into a coil with one terminal at the center of the coil and the other terminal at the periphery thereof.

11. A primary cell assembly according to claim 10, wherein the coil is disposed on a sleeve of insulating material, a supporting post is provided onto which said cell is disposed and ribbed members are carried by said post with at least one such member disposed at each end of said cell.

12. A primary cell assembly according to claim 10, wherein one type of electrode is corrugated in a manner such that when the electrodes and insulating material are rolled into a coil the corrugations are parallel substantially to the axis of the coil.

13. A primary cell assembly comprising a plurality of coiled cell units, each cell unit having the coil thereof disposed on a sleeve of insulating material, a supporting post onto which said cell units are disposed, ribbed washer members carried by said post and disposed at the ends of each cell unit, leads for said cell units and means for disposing at least certain of said leads internally of the sleeve of an adjacent cell unit and means to secure said cell units on said post.

14. A primary cell assembly according to claim 13, wherein said ribbed members are each provided with a tubular shank on at least one side for reception into the sleeve of a cell unit, at least certain of said members having an opening crosswise thereof through which said lead connections may be disposed for extension internally of said sleeve.

ARTHUR J. WARNER.
ANDRÉ R. GOBAT.

References Cited in the file of this patent

UNITED STATES PATENTS

| Number | Name | Date |
|---|---|---|
| Re. 22,053 | Ruben | Mar. 24, 1942 |
| 1,297,653 | Burgess | Mar. 18, 1919 |
| 1,587,356 | Riebeth | June 1, 1926 |
| 2,050,173 | Gordon | Aug. 4, 1936 |
| 2,422,046 | Ruben | June 10, 1947 |

FOREIGN PATENTS

| Number | Country | Date |
|---|---|---|
| 248,942 | Great Britain | Mar. 18, 1926 |